United States Patent [19]
Erhardt et al.

[11] Patent Number: 5,436,831
[45] Date of Patent: Jul. 25, 1995

[54] METHOD FOR DETECTING THE REVERSE TRAVEL OF A MOTOR VEHICLE

[75] Inventors: Rainer Erhardt; Uwe Hartmann, both of Stuttgart; Friedrich Kost, Kornwestheim; Anton Van Zanten, Ditzingen-Schoeckingen, all of Germany

[73] Assignee: Robert Bosch GmbH, Stuttgart, Germany

[21] Appl. No.: 83,124

[22] Filed: Jun. 25, 1993

[30] Foreign Application Priority Data

Jul. 16, 1992 [DE] Germany ............ 42 23 385.2

[51] Int. Cl.⁶ ............................................. G01P 13/04
[52] U.S. Cl. ............................. 364/424.01; 340/901
[58] Field of Search .................... 364/424.01, 424.05; 180/204; 340/901, 903, 904

[56] References Cited

U.S. PATENT DOCUMENTS

| | | | |
|---|---|---|---|
| 4,278,962 | 7/1981 | Lin | 340/904 |
| 4,561,064 | 12/1985 | Brüggen et al. | 340/904 |
| 4,638,295 | 1/1987 | Middlebrook et al. | 364/424.01 |
| 4,797,673 | 1/1989 | Dombrowski | 340/903 |
| 4,910,512 | 3/1990 | Riedel | 340/901 |
| 5,235,316 | 8/1993 | Qualizza | 340/903 |

*Primary Examiner*—Gary Chin
*Attorney, Agent, or Firm*—Kenyon & Kenyon

[57] ABSTRACT

In a method for detecting the reverse travel of a motor vehicle, the yaw speed and a model yaw-speed are obtained and, with the aid of these variables as well as constants, a factor $\Theta t$ is determined, which is compared to preselected comparison values. From these comparisons, it is determined whether forward travel or reverse travel exists.

13 Claims, 1 Drawing Sheet

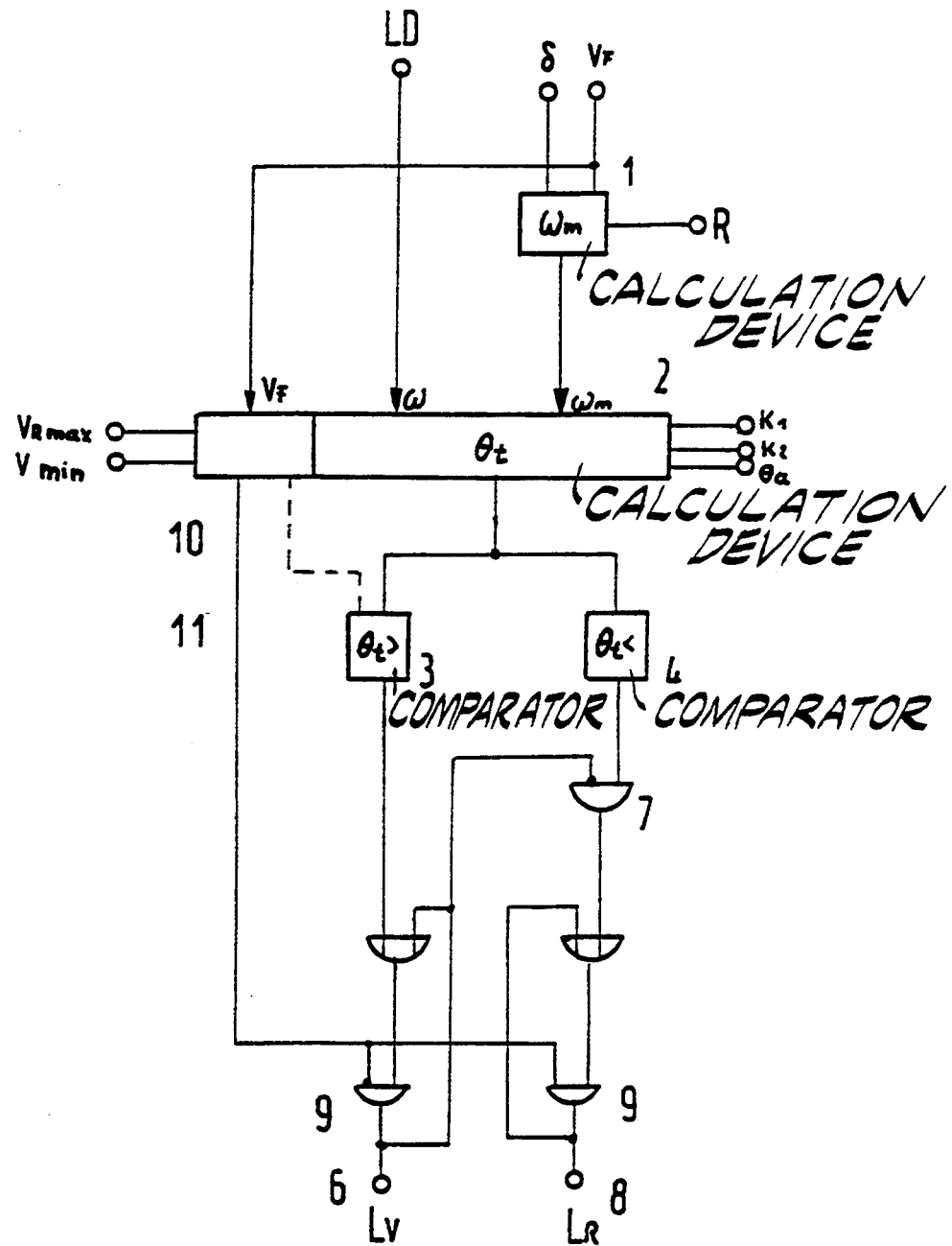

METHOD FOR DETECTING THE REVERSE TRAVEL OF A MOTOR VEHICLE

FIELD OF THE INVENTION

The present invention relates to the detection of vehicle travel and in particular to a method for detecting the reverse travel of a motor vehicle.

BACKGROUND INFORMATION

Automatic control concepts having to do with dynamic driving response have been described and proposed, in which yawing moments are artificially produced when there is a generation of, or change in, brake slippage at the wheels, or as a result of an angular change in the steering of the rear axle. These concepts are applied to reduce or to compensate for yawing moments which are too great, these yawing moments being caused by $\mu$-split braking, braking at curves, or other influences. These automatic control concepts are based on a model-supported closed-loop control. The model equations lose their validity when backward travel is involved. For this reason, it is necessary to modify the automatic control of the dynamic driving response. To achieve this, reverse travel must be reliably detected.

SUMMARY OF THE INVENTION

A method for detecting the reverse travel of a motor vehicle comprises the steps of:

determining a model yaw-angle speed $W_m$ as a function of a steering angle $\delta$, a vehicle speed $V_F$ and a wheel base R;

determining a current estimation value $\Theta t$ at a time t according to the equation:

$$\theta t = \theta t - 1 + \frac{k2}{W_m + k1 + k2}(\theta a - \theta t - 1) + \frac{W_m}{W_m + k1 + k2}(W - W_m \times \theta t - 1),$$

wherein W represents an additional yaw-angle speed, $\Theta t$-1 represents a previous estimation value, and k1, k2 and $\Theta a$ represent constants;

generating a forward-travel signal $L_v$ when at least one of $\Theta t > \Theta v$ and $V_F > V_{Rmax}$, wherein $\Theta v$ represents a first preselected, positive comparison value, and $V_{Rmax}$ represents a maximum reverse-travel speed;

generating a reverse-travel signal $L_R$ when the forward-travel signal $L_v$ is not generated and $\Theta t < -\Theta r$, wherein $\Theta r$ represents a second preselected, positive comparison value; and suppressing the reverse-travel signal $L_R$ when the forward-travel signal $L_v$ is generated.

The estimation method according to the present invention for detecting reverse travel employs only those sensors which are also used for the automatic control of the dynamic driving response. As a result, the additional expenditure is relatively low. Fault detection in the case of temporary, transient operations or unclear situations does not occur.

BRIEF DESCRIPTION OF THE DRAWING

The FIGURE is a block diagram illustrating the method according to the present invention.

DETAILED DESCRIPTION

The starting point for obtaining the estimation algorithm is the performance index:

$$J(\Theta t) = u^2(\Theta t) + k1 * v^2(\Theta t) + k2 * w^2(\Theta t)$$

where
$u(\Theta t) = (\Theta t*(W_m - W))$ ... measuring error;
$W_m$ ... model yaw-angle speed;
W ... measured yaw-angle speed;
$v(\Theta t) = \Theta t - \Theta t - 1$ ... change;
$w(\Theta t) = \Theta t - \Theta a$ ... deviation from start-up (breakaway) value;
$\Theta t$ ... current estimation value;
$\Theta t - 1$ ... estimation value for the previous computing cycle;
$\Theta a$ ... start-up value (preferably 0);
k1 ... weighting factor for old estimation value, e.g. 0.4;
k2 weighting factor for start-up value, e.g. 0.05

From the minimization of $J(\Theta t)$ with respect to $\Theta t$, it follows that $$\frac{dJ}{d\theta t} = 0$$

i.e., $$W_m*(\Theta t*W_m - W) + k1*(\Theta t - \Theta t - 1) + k2*(\Theta t - \Theta a) = 0.$$

When the equation is solved for $\Theta t$, it follows that $$\theta t = \theta t - 1 + \frac{k2}{W_m + k1 + k2} * (\theta a - \theta t - 1) + \frac{W_m}{W_m + k1 + k2} * (W - W_m \times \theta t - 1).$$

It is apparent from this equation that the measuring error is heavily weighted when $|W_m|$ is large. On the other hand, given a small $|W_m|$, $\Theta t$ shows more of a tendency toward the start-up value $\Theta a$. Forward or backward travel is recognized with the aid of the value $\Theta t$. The forward-travel signal $L_v$ is generated when $$\Theta t > \Theta v \text{ or } V_f > V_{Rmax} (e.g., \Theta v = 0.2).$$

$V_{Rmax}$ is the maximum achievable speed in the case of backward travel. The backward-travel signal $L_R$ is generated when $$\Theta t < -\Theta r \text{ (e.g., } \Theta r = 0.2) \text{ and } L_v \text{ is not available.}$$

In all other cases, $L_v$ and $L_r$ are not changed.

For the case when the motor vehicle is at a standstill ($V_F < V_{min}$), $\Theta t = 0$ is set, and neither of the signals $L_v$ or $L_R$ is generated.

The sensitivity of the recognition is able to be influenced on the whole by k1. k1 must be selected to be large enough to avoid an error detection in the case of short-term, transient driving states. k2 stipulates the level of the start-up of $\Theta t$ for $\Theta a$. It must be large enough to avoid an error detection in the case of long-lasting errors, such as sensor offsets.

The reverse-travel recognition according to the method of the present invention virtually represents a comparison between a model yaw-angle speed ($W_m = V_F \times \delta/R$) calculated from the vehicle speed and the steering angle, on the one hand, and the measured or estimated yaw-angle speed W, on the other hand, with the application of a simple least-square estimator.

Referring to the Figure, signals corresponding to the measured steering angle $\delta$ and to the vehicle speed $V_F$ determined, for example, from the wheel speeds, as well as a signal corresponding to the wheel base R of the vehicle, are fed to a block 1 via input terminals. This block 1 generates a model yaw-angle speed $W_m = V_F \times \delta/R$ (according to Ackermann).

Both the measured or estimated yaw-angle speed W and the model yaw-angle speed $W_m$ are fed to a block 2. In addition, constant values k1, k2 and $\Theta a$ are also fed to this block 2. k1 and k2 can be, for example, 0.4 and 0.05, respectively. $\Theta a$ is preferably 0. The instantaneous value for $\Theta$ is calculated in block 2 with the relation $\Theta t$ indicated above, and is then fed to comparators 3 and 4. The comparator 3 generates a signal as soon as $\Theta t$ exceeds a comparison value e v (e.g., 0.2). This signal allows a forward-travel signal $L_v$ to be generated at terminal 6. The $L_v$ signal is retained until another comparator 10 emits a signal. The comparator 10 emits a signal when the vehicle speed $V_F$ is lower than a breaking-off speed $V_{min}$ (meaning that the vehicle is at a standstill). The comparator 4 supplies a signal to the AND gate 7 when $\Theta t$ falls below a value of, for example, −0.2. In this manner, in case $L_v$ was not already set, the backward-travel signal $L_R$ can be set. This signal is also retained until the comparator 10 emits a signal.

In addition, the comparator 10 can determine, through comparison, whether $V_F$ is greater than the maximum possible reverse speed $V_{Rmax}$, and use this in addition to, or in place of, the comparison of $\Theta t$ to $\Theta v$ in order to generate the forward-travel signal $L_v$. This is indicated by the dotted line 11.

What is claimed is:

1. A method for detecting the reverse travel of a motor vehicle, comprising the steps of:
   determining a model yaw-angle speed $W_m$ as a function of a steering angle $\delta$, a vehicle speed $V_F$ and a wheel base R;
   determining a current travel estimation value $\Theta t$ as a function of an additional yaw-angle speed W at a time t according to the equation:

$$\theta t = \theta t - 1 + \frac{k2}{W_m + k1 + k2}(\theta a - \theta t - 1)$$
$$+ \frac{W_m}{W_m + k1 + k2}(W - W_m \times \theta t - 1),$$

wherein W represents the additional yaw-angle speed, $\Theta t - 1$ represents an old travel estimation value determined as a function of the additional yaw-angle speed W at a preselected time prior to the time t, and k1, k2 and $\Theta a$ represent constants;
   generating a forward-travel signal $L_v$ when at least one of $\Theta t > \Theta v$ and $V_F > V_{Rmax}$, wherein $\Theta v$ represents a first preselected, positive comparison value, and $V_{Rmax}$ represents a maximum reverse-travel speed;
   generating a reverse-travel signal $L_R$ when the forward-travel signal $L_v$ is not generated and $\Theta t < -\Theta \gamma$, wherein $\Theta r$ represents a second preselected, positive comparison value; and
   suppressing the reverse-travel signal $L_R$ when the forward-travel signal $L_v$ is generated.

2. The method according to claim 1, further comprising the step of suppressing the forward-travel signal $L_v$ and the reverse-travel signal $L_R$ when the motor vehicle is at a standstill.

3. The method according to claim 2, further comprising the step of setting the current estimation value $\Theta t$ to zero when the motor vehicle is at a standstill.

4. The method according to claim 1, wherein k1 represents a weighting factor for the old travel estimation value.

5. The method according to claim 4, wherein k1 is equal to 0.4.

6. The method according to claim 1, wherein k2 represents a weighting factor for a start-up value, the start-up value having a preselected value used to determine an initial value of the current travel estimation value $\Theta t$.

7. The method according to claim 6, wherein k2 is equal to 0.05.

8. The method according to claim 1, wherein $\Theta a$ represents a start-up value, the start-up value having a preselected value used to determine an initial value of the current travel estimation value $\Theta t$.

9. The method according to claim 8, wherein $\Theta a$ is equal to zero.

10. A method for detecting the reverse travel of a motor vehicle, comprising the steps of:
    determining a model yaw-angle speed $W_m$ as a function of a steering angle $\delta$, a vehicle speed $V_F$ and a wheel base R;
    determining a current travel estimation value $\Theta t$ as a function of an additional yaw-angle speed W at a time t according to the equation:

$$\theta t = \theta t - 1 + \frac{k2}{W_m + k1 + k2}(\theta a - \theta t - 1)$$
$$+ \frac{W_m}{W_m + k1 + k2}(W - W_m \times \theta t - 1),$$

wherein W represents the additional yaw-angle speed, $\Theta t - 1$ represents an old travel estimation value determined as a function of the additional yaw-angle speed W at a preselected time prior to the time t, and k1, k2 and $\Theta a$ represent constants;
    generating a forward-travel signal $L_v$ when at least one of $\Theta t > \Theta v$ and $V_F > V_{Rmax}$, wherein $\Theta v$ represents a first preselected, positive comparison value, and $V_{Rmax}$ represents a maximum reverse-travel speed; and
    generating a reverse-travel signal $L_R$ when the forward-travel signal $L_v$ is not generated and $\Theta t < -\Theta \gamma$, wherein $\Theta r$ represents a second preselected, positive comparison value.

11. The method according to claim 10, wherein the additional yaw-angle speed includes a measured yaw-angle speed.

12. The method according to claim 10, further comprising the step of suppressing the forward-travel signal $L_v$ and the reverse-travel signal $L_R$ when the motor vehicle is at a standstill.

13. The method according to claim 12, further comprising the step of setting the current travel estimation value $\Theta t$ to zero when the motor vehicle is at the standstill.

* * * * *

UNITED STATES PATENT AND TRADEMARK OFFICE
CERTIFICATE OF CORRECTION

PATENT NO. : 5,436,831
DATED : July 25, 1995
INVENTOR(S) : Rainer Erhardt, et al.

It is certified that error appears in the above-indentified patent and that said Letters Patent is hereby corrected as shown below:

Column 3, line 20, "e v" should be -- $e_v$ --;

Signed and Sealed this

Twenty-first Day of January, 1997

Attest:

BRUCE LEHMAN

*Attesting Officer*  *Commissioner of Patents and Trademarks*